United States Patent [19]

Lawall et al.

[11] 3,891,382

[45] June 24, 1975

[54] APPARATUS FOR CALCINING RAW MATERIAL

[75] Inventors: Thomas R. Lawall, Emmaus; Edward S. Porter, Bethlehem, both of Pa.

[73] Assignee: Fuller Company, Catasauqua, Pa.

[22] Filed: Feb. 27, 1974

[21] Appl. No.: 446,435

[52] U.S. Cl. .................................. 432/58; 432/106
[51] Int. Cl. ...................... F27b 15/00; F27b 15/10
[58] Field of Search ....................... 432/58, 103, 106

[56]  References Cited
UNITED STATES PATENTS

| | | | |
|---|---|---|---|
| 1,158,372 | 10/1915 | Carnie | 432/58 |
| 1,468,168 | 9/1923 | Pike | 432/106 |
| 2,607,666 | 8/1952 | Martin | 432/58 X |
| 2,621,034 | 12/1952 | Stecker | 432/58 |
| 3,452,968 | 7/1969 | Shimizu et al. | 432/58 |
| 3,595,542 | 7/1971 | Ashman | 432/58 |

*Primary Examiner*—John J. Camby
*Attorney, Agent, or Firm*—Frank H. Thomson

[57]  ABSTRACT

An apparatus for calcining raw material such as the raw material used for making Portland cement. The apparatus is used in conjunction with a preheater and a calciner, such as a rotary kiln, and a cooler. The calciner includes a vessel with means for supplying combustion gas to the bottom of the vessel, an outlet at the top of the vessel, for spent combustion gas and calcined material, a burner for producing a combustion zone intermediate the combustion air supply and the calcined material outlet. Raw material can be supplied to the vessel either from above the combustion zone and below the outlet or from below the combustion zone. The combustion air may be supplied from the cooler or a combination of the cooler and the exhaust gases from the clinkerer. The apparatus is primarily designed for using coal as a fuel.

6 Claims, 5 Drawing Figures

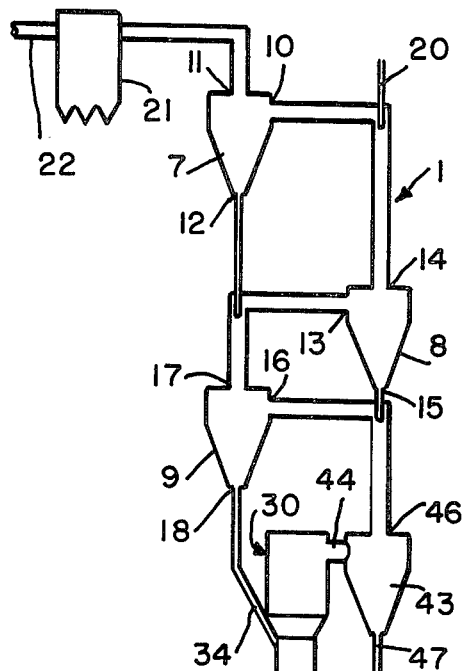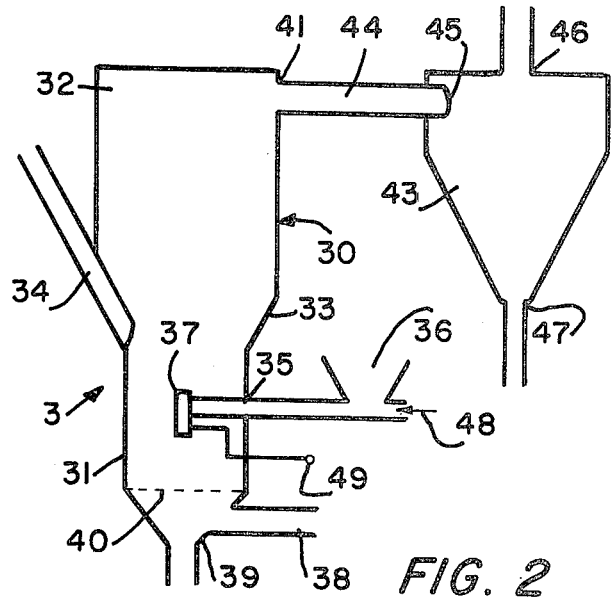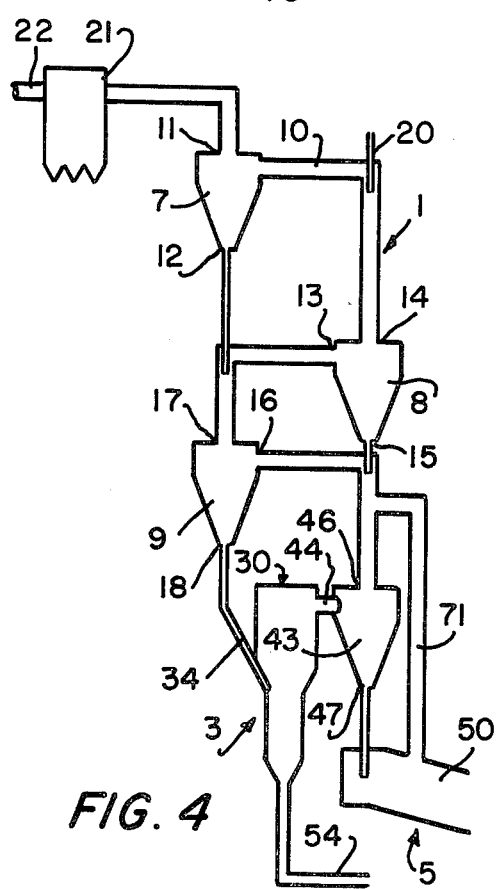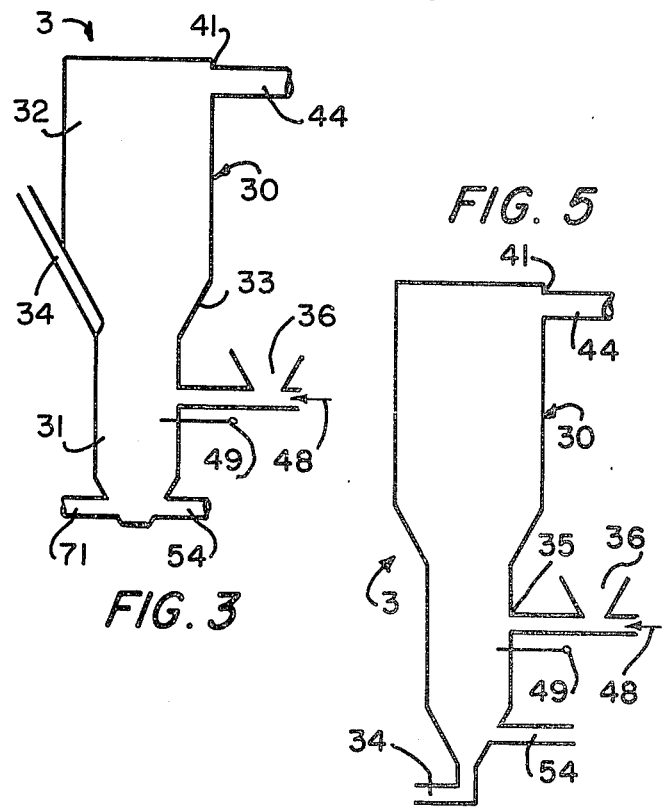

APPARATUS FOR CALCINING RAW MATERIAL

BACKGROUND OF THE INVENTION

The present invention relates to apparatus for calcining fine solid particulate material and in particular apparatus for flash calcining raw material such as that used to manufacture Portland cement. The invention may also be employed in other processes where fine solid particulate material must be calcined.

Prior to the present invention, it was generally known in the manufacture of Portland cement that the raw material must first be heated to a calcining temperature and then further heated to a clinkering temperature. After clinkering, the material is cooled by any of several well known techniques such as air quenching. The general practice today is to employ a rotary kiln for calcining and clinkering. More recent innovations include the use of some form of preheater employing the waste gases from the rotary kiln to preheat the raw material supplied to the rotary kiln.

Prior to the present invention it was known to employ a separate fired vessel for calcining the material thereby using the rotary kiln solely for clinkering. In this arrangement, there may be a separate preheater with the material discharged from the preheater being supplied to the calciner. The calcined material is then supplied to the rotary kiln for final clinkering. Fuel is supplied to the calciner for achieving calcining temperatures and additional fuel is supplied to the kiln for achieving the clinkering temperatures. Early systems employing this sequence are shown in U.S. Pat. Nos. 1,468,168 and 1,557,873. More recent systems employing this flow pattern are shown in U.S. Pat. No. 3,452,968 and Japanese Pat. No. 47-30405. With the more recent developments, a "flash calciner" is employed wherein combustion of fuel takes place in a vessel to produce high temperatures in the vessel, and raw material is passed through the vessel. The high temperatures in the vessel result in rapid calcination of the fine solid particulate material.

The more recent systems are beginning to make an impact on the Portland cement making industry in view of their ability to increase production capacity while employing a smaller kiln and achieving a more efficient production with a given amount of fuel. The more recent systems are primarily designed to operate with either oil or gas as a fuel. In order to have an apparatus which is useful for all types of fuel and in particular coal, modifications to the known designs have become necessary. This is because it is necessary to increase the retention time of the fuel in the calciner vessel when coal is employed as a fuel as opposed to the retention time for oil or gas. Increasing the fuel retention time insures complete combustion of the fuel and thereby provides an efficient system.

SUMMARY

It is therefore the principal object of this invention to provide an improved apparatus for calcining raw material which is capable of being operated with all types of fuel.

It is another object of this invention to provide an apparatus for manufacturing Portland cement which employes a flash calciner which can be operated with all types of fuel.

It is a further object of this invention to provide a calciner for raw material wherein the retention time of the fuel in the calcining vessel is increased so that the calciner can be operated with coal.

In general, the foregoing and other objects of this invention will be carried out by providing apparatus for calcining a raw material comprising a vessel having an inlet for combustion air and an outlet for spent combustion air: an inlet for raw material to be calcined downstream of the inlet for combustion air in the direction of combustion air flow and burner means for producing a combustion zone intermediate the inlet for raw material and said inlet for combustion air for calcining said raw material; said outlet for spent combustion air being an outlet for calcined material and being downstream of said inlet for raw material in the direction of combustion air flow.

The objects will also be carried out by providing apparatus for calcining raw material comprising; a vessel having an inlet for raw material to be calcined, an inlet for fuel for combustion herein, means for producing a combustion zone in said vessel and an outlet for spent combustion air and calcined material; said combustion zone and said outlet for spent combustion air in the direction of combustion air flow.

PREFERRED DESCRIPTION OF THE DRAWINGS

The invention will be described in connection with the annexed drawings wherein:

FIG. 1, is a diagrammatic view of a clinkering system employing the present invention;

FIG. 2 is a view on an enlarged scale of the calciner of the present invention;

FIG. 3 is a view similar to FIG. 2 showing a modification of the present invention;

FIG. 4 is a view similar to FIG. 1 showing a further modification of the present invention; and FIG. 5 is a view similar to FIGS. 2 and 3 showing a still further modification of the present invention.

DESCRIPTION OF THE PREFERRED EMBODIMENTS

Referring to the drawings, there is shown in FIG. 1 a diagrammatic view of a system according to the present invention which may be used for manufacturing Portland cement. In general, the apparatus includes in the direction of material flow a preheater generally indicated at 1 which is in the form of a suspension preheater generally well known in the art. The preheater 1 is followed by a flash calciner generally indicated at 3, a clinkerer 5 in the form of a rotary kiln and a cooler 6.

The preheater 1 includes a plurality of serially connected gas solids separators in the form of cyclones 7, 8 and 9. The cyclone 7 includes an inlet 10 for gas and entrained solids, an outlet 11 for separated gases and an outlet 12 for separated solids. The cyclone 8 includes an inlet 13 for gas and entrained solids, an outlet 14 for separated gases and an outlet 15 for separated solids. Similarly, the cyclone 9 includes an inlet 16 for gas and entrained solids, an outlet 17 for separated gases and an outlet 18 for separated solids.

An inlet 20 for raw material is provided in the outlet 14 of the cyclone 8. A high-efficiency dust collector 21 is flow connected to the outlet 11 of the cyclone 7 and includes an outlet 22 suitably connected to a stack.

The flash calciner of the present invention is generally indicated at 3 and is flow connected in series to the preheater 1. The calciner may be in the form shown in any of FIGS. 2, 3 or 5, but for the present, that shown in FIG. 2 will be described. Referring to FIG. 2 there is shown a generally upright vessel 30 which includes a first portion 31 having a first diameter and a second, upper portion having a second diameter larger than the first diameter. A transition section 33 may be provided. The vessel includes an inlet 34 for raw material to be calcined flow connected to the outlet 18 of cyclone 9 of the preheater 1. In FIG. 2, this inlet 34 is shown as located at the transition section 33, but may be located in the second portion 32. The vessel 30 also includes an inlet 35 for fuel which is suitably connected to a source 36 of fuel such as pulverized coal. A burner 37 may be provided in the vessel 30 in the first portion 31. The burner may be centered in the vessel 30 or outside the vessel with the flame directed into the center of the vessel. The coal may be conveyed to the burner and the inlet 35 by compressed air as at 48 from a suitable source. Depending upon the burner used, an igniter flame of oil such as that indicated at 49 may be required. The burner produces a combustion zone in the first portion 31 of the vessel. The inlet 34 for raw material to be calcined is designed to direct material toward this combustion zone.

A source of combustion air is supplied from a conduit 38 to an inlet 39 of a vessel below the inlet 35 for fuel. If desired, a gas diffusion or distributor plate 40 may be provided above the combustion air inlet 39 and below the fuel inlet 35. An outlet 41 for calcined material and spent combustion air is provided in the top of the vessel 30. Thus, in the direction of combustion gas flow, the combustion zone is downstream of the combustion gas inlet and upstream of the inlet for material to be calcined and the spent combustion gas outlet.

A gas solids separator 43 in the form of a cyclone is flow connected to the vessel 30 by means of a conduit 44 connected to the outlet 41 of the vessel 30. The cyclone 43 includes a tangential inlet 45 for the gas and entrained solids, a separated gas outlet 46, and a separated solids outlet 47.

The clinkerer 5 in the form of a conventional rotary kiln 50 is flow connected to the calciner 3 and in particular is supplied raw material through conduit 47 from the cyclone 43. The discharge end 51 of the kiln 50 includes means 52 for supplying fuel to the kiln and means 53 for supplying combustion air to the kiln. The fuel supplied to the kiln is used for clinkering the raw material.

The cooler generally indicated at 6 in FIG. 1 includes means 61 for supplying cooling air for passage through a bed of hot material in the cooler 6. As the cool air passes through the hot material it serves to cool the hot clinker and the air is heated by such hot clinker. At least some of the thus heated air is supplied to the kiln 50 to serve as preheated combustion air. This is supplied to the kiln through conduit 53. Additional heated air is supplied through conduit 54 to the calciner 3 to serve as combustion air in the calciner 3. The remaining spent cooled air is discharged into conduit 63 to a high-efficiency dust collector 64 for discharge to atmosphere.

In the embodiment shown in FIG. 1, the calciner may include a mixing chamber 70 and exhaust gases from the kiln 50 is supplied to this mixing chamber 70 through a suitable conduit 71 and the heated cooling air from conduit 54 is supplied to the mixing chamber 70. The combustion air conduit 38 of the calciner vessel 30 is connected to the mixing chamber 70.

In operation, raw material is supplied to the preheater 1 at 20 and in particular to the conduit connecting the outlet 14 of cyclone 8 and the inlet 10 of cyclone 7. Hot gases discharged from cyclone 8 entrain the raw material and convey the same to inlet 10 of cyclone 7 thereby preheating the raw material a certain amount.

In the cyclone 7 the particulate material is separated from the gas and discharged through the outlet 12 to the conduit connecting the gas outlet 17 of cyclone 9 and the gas-solids inlet 13 of the cyclone 8. The gases are discharged from cyclone 7 through outlet 11 to dust collector 21. The solids from outlet 12 are entrained in the gases discharged from cyclone 9 and conveyed to the cyclone 8. These gases further preheat the raw material. In the cyclone 8, the gases are separated to the outlet 14 and the solids are discharged through conduit 15 into the gas outlet 46 of the cyclone 43 of the calciner 3. These hot gases entrain the solids and convey them to inlet 16 of cyclone 9. In the cyclone 9, the solids are separated from the gases and discharged through conduit 18 to the inlet 34 of the calciner 3.

In the calciner 3, the combustion takes place in the first portion 31 and the preheated raw material is directed downwardly into the combustion zone generally countercurrent to the upward flow of combustion gases. When coal is used as a fuel, complete combustion of the fuel takes longer than gas or oil. It is important to keep the coal particles in the calciner until complete combustion takes place. Because the combustion air inlet is below the fuel supply inlet 35 and the combustion zone, the upwardly flowing air keeps the fuel and raw material in suspension and insures that all of the fuel is burned and will not drop out of the combustion zone. With the raw material directed toward the combustion zone, the material passes through the combustion zone to achieve rapid or "flash" calcination of the raw material. The larger diameter portion 32 serves to reduce the velocity of gas flowing through the calciner 3 so that retention time in the vessel 30 will be increased and insure complete calcination of the raw material.

With the addition to the calciner of preheated combustion air from the cooler and hot exhaust gases from the kiln, less fuel need be added directly to the calciner to achieve the desired calcination temperature.

The spent combustion gas and calcined raw material are discharged from the vessel 30 at 41 and conveyed by conduit 44 to cyclone 43. The separated gases are discharged at 46 and the separated solids are discharged at 47 and supplied to the clinkerer 5 for further processing.

In the modification shown in FIG. 3, the mixing chamber 70 has been eliminated and the exhaust gases from the clinker 5 are conveyed directly to the vessel 30 by conduit 71 and the hot gases from the cooler 6 are supplied to the vessel 30 by conduit 54. The bottom of the vessel 30 serves as a mixing chamber. In the embodiment shown in FIG. 3 the conduit 71 and 54 are spread around the vessel 30 to insure proper mixing of the spent cooler gases and the hot kiln exhaust gases. Also in the embodiment of FIG. 3 the distributor plate 40 has been removed.

In the modification shown in FIG. 4, the exhaust gases from the clinker 5 are not used in the calciner 3, but are supplied directly to the preheater 1, bypassing the calciner 3. All of the combustion air used by the calciner 3 is supplied from the conduit 54 from the cooler 6.

In the modification shown in FIG. 5, the raw material is supplied to the calciner 3 below the fuel source 35 and combustion zone rather than above the fuel inlet 35 as shown in FIGS. 2 and 3. It is believed that by supplying the raw material with the combustion air below the combustion zone, proper mixing of the fuel and raw material and combustion air will take place. As in the embodiments of FIGS. 2 and 3 the calcined material outlet is located at the top of the vessel 30.

From the foregoing it should be apparent that the objects of the present invention have been carried out. The calcining vessel serves to rapidly calcine the solid particulate material. The combustion air and raw material inlets, the combustion zone and the calcined material and spent combustion gas outlet are positioned to insure complete combustion of the fuel and complete calcination of the raw material. This arrangement is particularly advantageous for using coal as a fuel.

It is intended that the foregoing be merely a description of a preferred embodiment and that the invention be limited solely by that which is within the scope of the appended claims.

We claim:

1. Apparatus for calcining raw material comprising: a vessel having an inlet for raw material to be calcined, means for producing a combustion zone in said vessel, as inlet for combustion air and an outlet for spent combustion air and calcined material whereby the direction of combustion air flow is from said inlet for combustion air to said outlet for spent combustion air through said vessel;

said inlet for raw material and combustion air being located upstream of said inlet for fuel and said outlet for spent combustion air in the direction of combustion air flow.

2. Apparatus for calcining raw material comprising: an upright vessel having an inlet for combustion air near one end, an outlet for spent combustion air near the other end, an inlet for material to be calcined intermediate the inlet for combustion air and the outlet for spent combustion air and an inlet for fuel intermediate the inlet for combustion air and the inlet for material to be calcined;

means for supplying material to be calcined to said inlet for material to be calcined whereby the material to be calcined is directed into a combustion zone and is calcined therein; and means for supplying combustion air to said inlet for combustion air whereby the combustion air flows through said vessel to said outlet for spent combustion air and calcined raw material is discharged from said vessel with spent combustion air.

3. Apparatus for calcining raw material according to claim 1 further comprising a diffusion plate mounted in said vessel intermediate said inlet for combustion air and said inlet for raw material to be calcined.

4. Apparatus for calcining raw material according to claim 1 further comprising a gas-solids separator and conduit means flow connecting said outlet for spent combustion air to said gas-solids separator; said gas solids separator being adapted to separate calcined material from the spent combustion air discharged from said vessel.

5. Apparatus for calcining raw material according to claim 4 further comprising a diffusion plate mounted in said vessel intermediate said inlet for combustion air and said inlet for raw material to be calcined.

6. Apparatus for calcining raw material according to claim 4 wherein said vessel includes a first portion having a first diameter and a second portion having a diameter larger than said first portion and said inlet for fuel is in said first portion and said outlet for spent combustion air, is in said second portion.

* * * * *

UNITED STATES PATENT OFFICE
CERTIFICATE OF CORRECTION

PATENT NO. : 3,891,382
DATED : June 24, 1975
INVENTOR(S) : Thomas R. Lawall and Edward S. Porter It is certified that error appears in the above-identified patent and that said Letters Patent are hereby corrected as shown below:

Column 5, line 31, "as" should read --an--.

Column 5, line 37, "said" should read --an--.

Signed and Sealed this

Tenth Day of May 1977

[SEAL]

Attest:

RUTH C. MASON
Attesting Officer

C. MARSHALL DANN
Commissioner of Patents and Trademarks